J. L. WEBSTER.
DEMOUNTABLE RIM FOR VEHICLE WHEELS.
APPLICATION FILED FEB. 13, 1914.
1,111,423.
Patented Sept. 22, 1914.
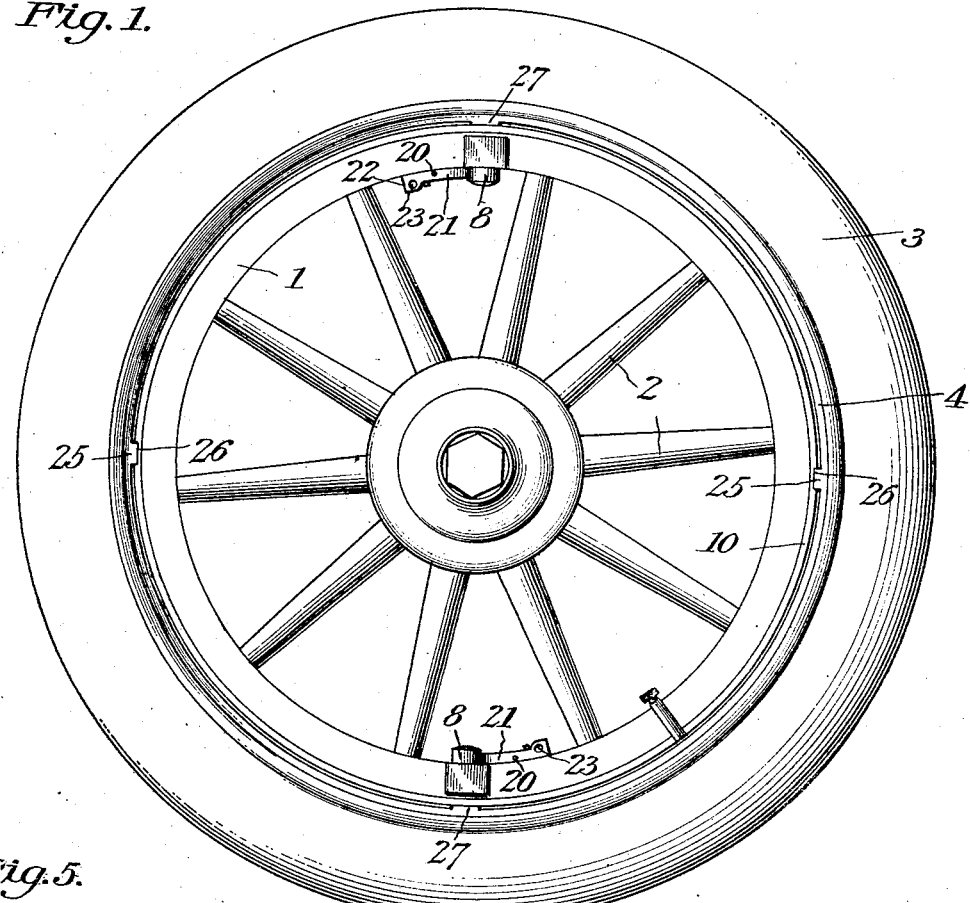
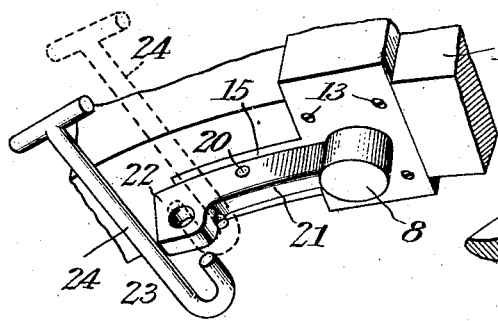
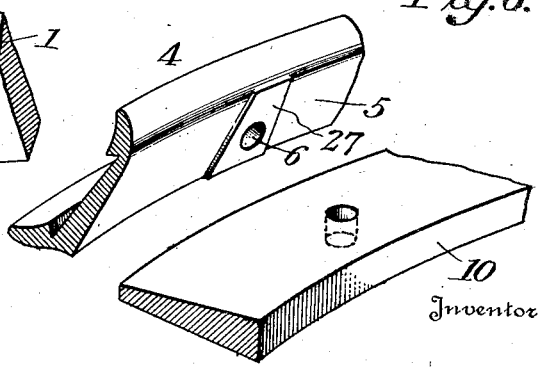

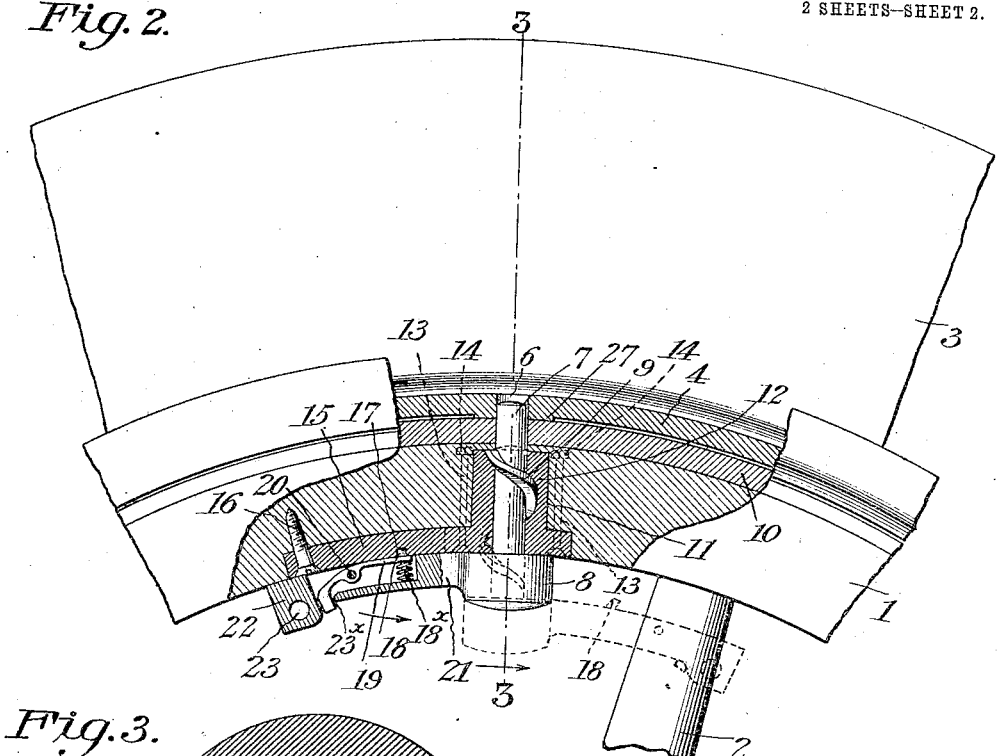
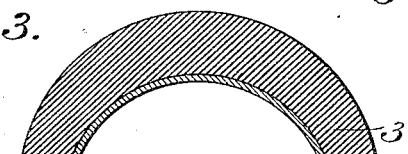
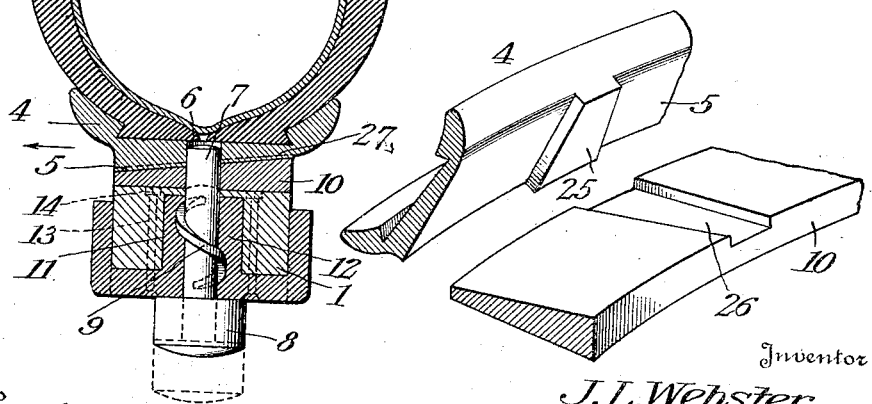

"UNITED STATES PATENT OFFICE.

JOHN LOREN WEBSTER, OF CHICAGO, ILLINOIS.

DEMOUNTABLE RIM FOR VEHICLE-WHEELS.

1,111,423.

Specification of Letters Patent.  Patented Sept. 22, 1914.

Application filed February 13, 1914. Serial No. 818,574.

*To all whom it may concern:*

Be it known that I, JOHN L. WEBSTER, a citizen of the United States, residing at Chicago, in the county of Cook and State of Illinois, have invented certain new and useful Improvements in Demountable Rims for Vehicle-Wheels; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in devices for removing and replacing tires upon vehicle rims and comprises a demountable rim of this nature having various details of construction and combinations and arrangements of parts which will be hereinafter fully described, shown in the accompanying drawings and then specifically defined in the appended claims.

I illustrate my invention in the accompanying drawings, in which:—

Figure 1 is a side elevation of a vehicle wheel showing the application of my invention thereto. Fig. 2 is an enlarged detail in elevation of a portion of the rim of a wheel and tire, part being shown in section to better illustrate features of the invention. Fig. 3 is a sectional view on line 3—3 of Fig. 2. Fig. 4 is a detail perspective view of parts of the invention. Fig. 5 is a detail perspective view of the locking means, and Fig. 6 is a view showing parts of the rim sections.

Reference now being had to the details of the drawings by numeral, 1 designates a felly of the wheel and 2 the spokes and 3 a pneumatic tire which is fastened to the band 4 which has its inner surface 5 inclined, as shown clearly in Fig. 3 of the drawings, and is apertured at 6 for the reception of the locking bolt 7, which latter is provided with a head 8 and has a spiral thread 9 formed upon its circumference.

A fixed rim, designated by numeral 10, is fastened to the wheel felly 1 in any suitable manner and at intervals in said felly 1 are formed recesses 11 in which the socket members 12 are seated and which are held in place by means of bolts 13 passing through the felly and engaged by nuts 14 of said socket members, there being two shown in the drawings diametrically opposite each other. Each has a lateral extension 15 which is countersunken in a recess formed in the inner marginal edge of the felly and held therein by means of screws 16. Each extension 15 has a notch 17 formed in its outer face adapted to receive the lug 18 integral with the end of the lever 19 which is pivotally mounted upon the pin 20 carried by the swinging arm 21 which is integral with the bolt head 8. A coiled spring $18^x$ serves to hold the lug 18 in the notch 17, and the other end of the lever is bent at an angle and extends through an aperture $23^x$. Said arm 21 has a lug 22 at one end which is apertured as at 23 for the reception of a key 24, a detail of which is shown in Fig. 5 of the drawings. The bore of the socket member 12 has a spiral groove therein adapted to be engaged by the thread 9 and said bolt 7 is adapted, as the bolt is moved longitudinally, to move through the registering apertures formed in the band 4 and fixed rim 10, as shown in Figs. 2 and 3 of the drawings.

Upon reference to Fig. 4, it will be noted that the band 4 is provided with a lug 25 upon its inner circumference and the opposite edges of which are inclined and adapted to engage a similar shaped recess 26 formed in the outer inclined surface of the fixed rim 10 and which serves to hold the two from turning independent one of the other. In Fig. 1 of the drawings, I have shown two of said projections 25 arranged diametrically opposite each other and it will be noted that the projections 25 are slightly wider than the depth of the recess, serving to hold the band 4 spaced apart a slight distance from the felly band, while lugs or projections 27 project about the inner marginal edge of the apertures 6 and beyond the inner circumference of the band 4, thus forming four projections for holding the band and fixed rim spaced apart to prevent the latter binding together too tightly which would interfere with their ready removal one from the other.

In applying and removing the tire with its band 4, the latter is placed about the inclined circumference of the fixed rim 10 and, when the apertures in the band and fixed rim are in registration, the arms 21 may be swung from the position shown in dotted lines in Fig. 2 in which the bolt is at its farthest outer throw to the position shown in solid lines in the same figure, which will cause the bolt to be thrown forward through the registering apertures in the band and fixed rim, thus securely holding the latter in a locked relation. As the lever comes in such position that the lug 18 comes into registration with the notch 17, the spring 18ˣ will throw said lug into said notch and hold the lever from turning.

When it is desired to move the band the key 24, shown in Fig. 5 and which has a hooked end, is made to engage the hole 23 in the lever 19 and by swinging the key from the position shown in solid lines in Fig. 5 to that in dotted lines, the shank portion of the key bearing against the projecting end of the lever 19 may cause the same to tilt and throw the same out of said notch and the key, utilized as a handle, may cause the lever to swing and the bolt to turn and assume the position shown in dotted lines in Fig. 2, after which the band section with the tire attached may be readily removed.

It will be noted from the construction shown and described that a simple and efficient means is afforded whereby a tire with the band and fixed rim may be easily and quickly applied to or removed from the felly of a wheel.

What I claim to be new is:—

1. A demountable rim for vehicle wheels comprising a band and a fixed rim, the latter adapted to be fastened to the felly of the wheel and having its outer circumference tapering and the other designed to receive a tire and tapering upon its inner circumference, the said band and fixed rim adapted to telescope each other, a bolt mounted in the felly and adapted to engage registering apertures in the fixed rim and band, the head of the bolt having an arm, a lever pivotally mounted upon said arm and having a lug projecting therefrom for engagement with the felly, said arm being provided with an apertured lug designed to receive a key, as set forth.

2. A demountable rim for vehicle wheels comprising two rim sections, one adapted to be fastened to the wheel rim and having its outer circumference tapering and the other designed to receive a tire and tapering upon its inner circumference, the two band sections adapted to telescope each other, a socket member mounted in a recess in the wheel felly and provided with a spiral groove upon its inner wall, a bolt engaging said groove and adapted, as the bolt is rotated, to move through registering apertures in the rim sections, said socket member having a lateral projection with a notch therein, the head of the bolt being provided with an arm, a pivotal spring-pressed lever mounted upon said arm and having a lug for engagement with said notch, as set forth.

3. A demountable rim for vehicle wheels comprising two rim sections, one adapted to be fastened to the wheel rim and having its outer circumference tapering and the other designed to receive a tire and tapering upon its inner circumference, the two band sections adapted to telescope each other, a socket member mounted in a recess in the wheel rim and provided with a spiral groove upon its inner wall, a bolt engaging said groove and adapted, as the bolt is rotated, to move through registering apertures in the rim sections, said socket member having a lateral projection with a notch therein, the head of the bolt being provided with an arm, said arm having a recess in its inner face, a pivotally mounted spring-pressed lever in said recess having a lug for engagement with said notch, one end of the lever extending through an aperture in the wall of the recess and the end of the arm terminating in a lug which is apertured for the reception of a key, one end of which is adapted, as the key is turned, to bear against the end of the lever projecting through said aperture to cause the lever to be tilted, as set forth.

In testimony whereof I hereunto affix my signature in presence of two witnesses.

JOHN LOREN WEBSTER.

Witnesses:
 EDWARD W. MAYER,
 BERNHARD G. HULSEBERG.

Copies of this patent may be obtained for five cents each, by addressing the "Commissioner of Patents, Washington, D. C."